United States Patent [19]
Danneels

[11] Patent Number: 6,038,598
[45] Date of Patent: Mar. 14, 2000

[54] METHOD OF PROVIDING ONE OF A PLURALITY OF WEB PAGES MAPPED TO A SINGLE UNIFORM RESOURCE LOCATOR (URL) BASED ON EVALUATION OF A CONDITION

[75] Inventor: Gunner D. Danneels, Beaverton, Oreg.

[73] Assignee: Intel Corporation, Santa Clara, Calif.

[21] Appl. No.: 09/028,163

[22] Filed: Feb. 23, 1998

[51] Int. Cl.[7] .............................. G06F 13/00; G06F 17/30
[52] U.S. Cl. .......................... 709/219; 709/203; 707/501
[58] Field of Search .................................. 709/105, 201, 709/203, 202, 217, 218, 219, 225, 226, 229; 707/10, 100, 104, 501; 705/26

[56] References Cited

U.S. PATENT DOCUMENTS

| | | | |
|---|---|---|---|
| 5,761,662 | 6/1998 | Dasan | 707/10 |
| 5,774,670 | 6/1998 | Montulli | 709/227 |
| 5,894,554 | 4/1999 | Lowery et al. | 707/10 |
| 5,918,228 | 6/1999 | Rich et al. | 707/10 |
| 5,930,792 | 7/1999 | Polcyn | 707/9 |
| 5,933,827 | 8/1999 | Cole et al. | 707/10 |

OTHER PUBLICATIONS

"Microsoft Internet Information Server, Web Application Server for the Windows NT Server Operating System", Microsoft Internet Information Active Server Pages White Paper, Cover Page, Abstract, Table of Contents and pp. 2–11, 1996.

*Primary Examiner*—Viet D. Vu
*Attorney, Agent, or Firm*—Steven P. Skabrat

[57] ABSTRACT

A content author generates multiple sets of web pages and associated conditions which map to a specified uniform resource locator (URL). The web page sets, associated conditions, and a state information database are installed on a server system. A state setting device, which may be the content author's personal computer, sets the current state of the state information database associated with the web page sets within the server system. Upon receipt of a request for access to a selected web page identified by the URL, the server system evaluates the conditions based on the associated state to determine which one of the web page sets to return in response to a user's request. The state setting device updates the state, thereby dynamically affecting web page set selection, based on factors internal or external to the server system.

29 Claims, 2 Drawing Sheets

METHOD OF PROVIDING ONE OF A PLURALITY OF WEB PAGES MAPPED TO A SINGLE UNIFORM RESOURCE LOCATOR (URL) BASED ON EVALUATION OF A CONDITION

BACKGROUND OF THE INVENTION

1. Field of the Invention

The present invention relates generally to computer systems and more specifically to browsing of dynamic World Wide Web (WWW) pages.

2. Description of Related Art

The WWW and the Internet are widely used for the dissemination of information contained in web pages. A web page is a file on a computer system containing information for display or other presentation to a user. Web pages are typically written in hyper-text markup language (HTML) and contain references to associated text, graphics, and other multimedia files. A system for accessing web pages includes several parties and components. A content author creates web pages of information. A server system stores the web pages, including their content and possibly executable scripts embedded in the web pages, and accepts requests for access to the web pages. A client system executing a browser program generates requests for web pages that are sent to the server system. The client system and the server system are typically connected via a computer network (e.g., the Internet or a company intranet). The server system retrieves the requested web pages and forwards them to the browser program on the client system for viewing by the user of the client system.

Some web pages on the server system can interact dynamically with the user operating the client system. For example, the server can provide different content of a web page (such as an advertisement) based on demographic information gathered from the user. As another example, the server can consult databases of information stored on the server or on another accessible computer system and return the results of the database queries based on input from the user. Examples of dynamic web page technology include the Active Server Page technology from Microsoft Corporation and the server-based JavaScript™ scripting technology from Netscape Communications Corporation. These technologies allow dynamic web pages to be built and returned to the user, however, they are focused on user/server interactions such as generating a query to a database. Web pages do not currently model the dynamics of the server system nor the server-content author relationship very well. In a server system, the only dynamic information available returned to the user is that the requested web page could not be loaded (i.e., an error condition). The server-content author relationship is not modeled at all. For example, the server cannot return different web pages if the content author is currently connected to the Internet (i.e., the author is "on-line"). Furthermore, the server does not rely on any internal or external factors when determining which web page to return to the client system as a result of a user request.

Thus, an improved method of accessing dynamic web pages is desired that overcomes the deficiencies and limitations of the prior art.

SUMMARY OF THE INVENTION

An embodiment of the present invention is a method of providing web pages by a server. The method includes the steps of mapping a plurality of web pages to a single uniform resource locator (URL), the web pages each having at least one associated condition; setting a state corresponding to the plurality of web pages in a database; accepting a request for a selected web page specified by a URL; evaluating at least one condition associated with the selected web page based on the state; and sending the selected web page when at least one condition is met.

BRIEF DESCRIPTION OF THE DRAWINGS

The features and advantages of the present invention will become apparent from the following detailed description of the present invention in which.

DETAILED DESCRIPTION OF THE INVENTION

Figure 1:
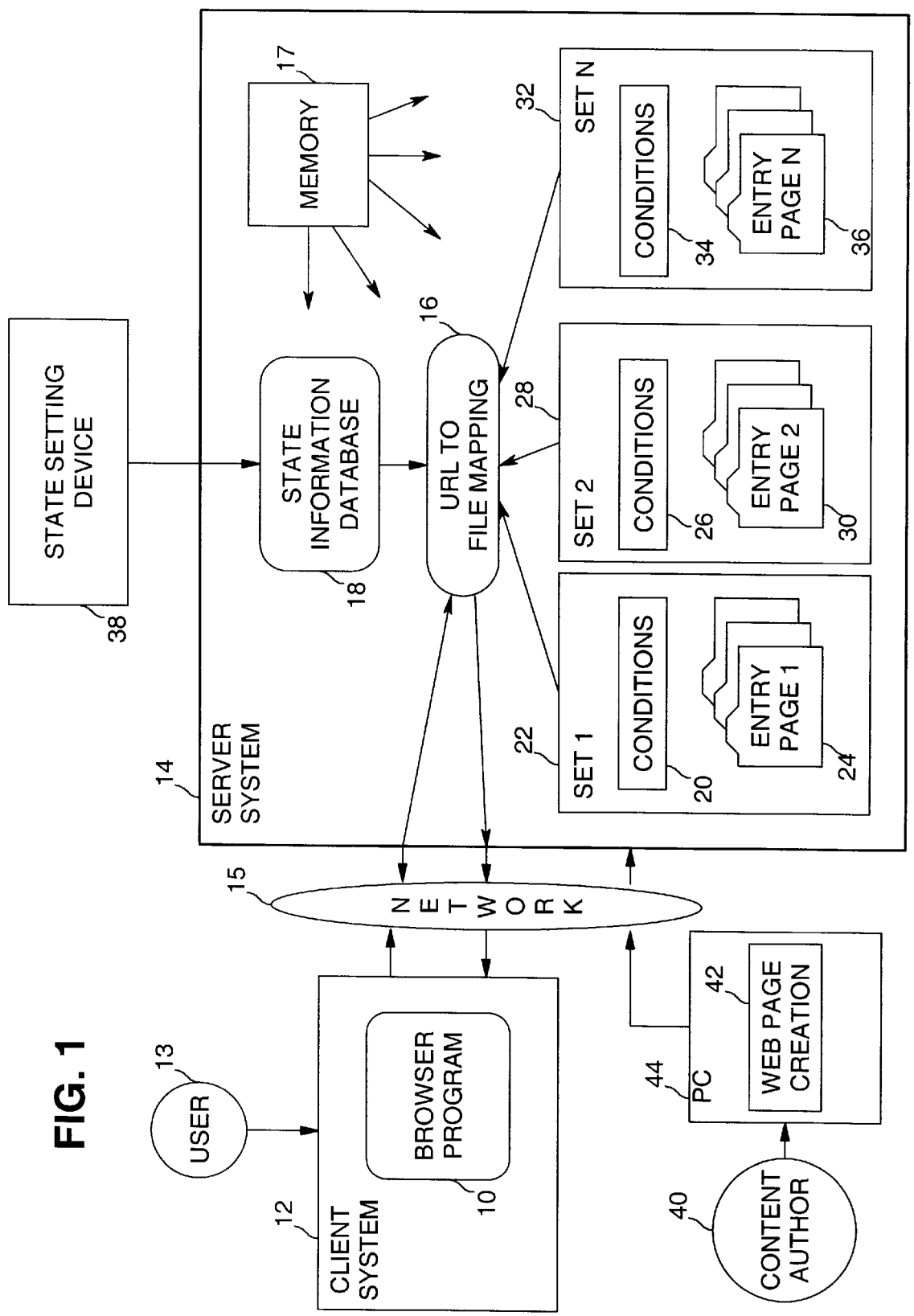
FIG. 1 is a block diagram of an embodiment of the present invention showing the server-state setting device relationship.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

An embodiment of the present invention overcomes the deficiencies of the prior art by allowing a content author to generate multiple sets of web pages and to set the conditions which the server evaluates to determine which of the web page sets to return in response to a user's request.

A web page set is defined as a group of HTML web pages that are interconnected by links such that there are no links into the set except from a single web page, called the entry page to the web page set. In addition, a web page set contains conditions to be evaluated to determine if the web page set is active and currently available for access. Multiple web page sets are mapped to a single Uniform Resource Locator (URL). When a server receives a request for a URL, it determines the web page sets which can be served to the user. The server then examines each web page set in turn, evaluating the conditions for each one. When the server finds a set where the conditions are evaluated to be true, the server returns the set's entry page as the response to the URL. A content author creates the multiple web page sets and stores them on the server system, and also defines the conditions for access to each web page set.

In one embodiment, links from pages in the web page set to other pages are allowed, but links from other pages to the web page set must go through the entry page. For example, if there are two web page sets stored in directories d1 and d2, the accompanying URLs might be:

Web page set 1
http://server/d1 /entry.html
http://server/d1/page1.html
http://server/d1/page2.html
Web page set 2
http://server/d2/entry.html http://server/d2/page1.html
http://server/d2/page2.html Each of the pages of the sets are linked to each other, so that within the first set, if page2.html refers to page1.html, it would use the link "http://server/d1/page1.html" and no conditional evaluation would occur. The only situation in this example where a condition would be evaluated is when the file to URL mapping on the server had the following information:

URL http://server/infostart.html
Condition (server load <50%,) http://server/d1/entry.html
Condition (True) http://server/d2/entry.html If the user enters the URL "http://server/infostart.html", the URL is mapped appropriately to one of the linked web page sets based on evaluation of the conditions.

Since links outside of a web page set are allowed, it is possible to link from one set to another. The case where every page is a web page set by itself is also allowed.

The conditions for each web page set may be dependent on the status of devices or users external to this server. For example, the state setting device might be an environmental sensor, another computer system, another electronic device, etc. Generally, any device capable of setting the state of a variable that can be input to the server may be used. Some examples include the "on-line" status of the content author of the web page sets, the status of a video camera, and the status of a motion-detecting sensor. Alternatively, the conditions for each web page set may be dependent on the status of factors internal to the server such as the current processing load of the server. In this example, if the load of the server is light, the server allows transfer of web pages with large amounts of information or large files (such as for full motion video). If the load of the server is heavy, the server allows only the transfer of selected portions of web pages that are smaller in size (such as still images), along with a message to the user to try again later. In another example, the conditions are dependent on the current time of day.

FIG. 1 is a block diagram of an embodiment of the present invention showing the server-state setting device relationship. A browser program 10 executing on a client system 12 and operated by a user 13 is employed to access web pages. Examples of the browser program include the well known Internet Explorer browser available from Microsoft Corporation and the Navigator browser available from Netscape Communications Corporation. The client system is representative of a personal computer system (PC), although any computer system capable of interacting as a client with a server system may be used. The browser system 10 makes a request for access to a web page by sending a URL to the server system 14. The client system is connected to the server system via a computer network 15, such as the Internet or an intranet. Server system 14 executes Internet server software (e.g., Internet Information Server web application server for the WINDOWS NT server operating system available from Microsoft Corporation) to field requests for web pages from client systems.

Server system 14 includes software for performing a URL to file mapping 16. The instructions of this software are stored in memory 17 within the server system. Memory 17 may be read-only memory (ROM), random access memory (RAM), or other storage devices such as disk drives, tape drives, CD-ROMs and the like. The instructions are executed by at least one processing unit (not shown) of server system 14. The URL to file mapping function identifies which sages are candidate pages to be returned for the URL. It then processes the conditions associated with each candidate page. When it finds that one of the conditions evaluates to True, it returns that page as the response to the URL request.

In prior art systems, the server system unconditionally retrieves a specific file accessible on the server system which is identified by the URL. If the server system cannot locate the requested file, or any other error occurs, then an error code is returned to the client system. In an embodiment of the present invention, URL to file mapping function 16 checks state information database 18 to obtain one or more current state variables associated with the requested URL. The URL to file mapping function then evaluates the conditions 20 of a first set (Set 1 22) of web pages based on the current state variable(s) to determine if current access to Set 1 is allowed. If the conditions 20 evaluate to true based on the current state variable(s), then Entry Page 1 24 is returned to the browser program 10 on the client system 12. If the conditions 20 evaluate to false, then conditions 26 for a new set (Set 2) of web pages 28 are consulted. The URL to file mapping function then evaluates the conditions 26 of the second set of web pages to determine if current access to Set 2 is allowed. If the conditions 26 evaluate to true based on the current state variable(s), then Entry Page 2 30 is returned to the browser program 10 on the client system 12. All web page sets and associated conditions are stored in memory 17.

In one embodiment, there are only two sets of web pages per URL. If the first conditions evaluate to false, then the second set of web pages is used as a default set. Alternatively, in other embodiments there are any number of sets of web pages and associated conditions mapping to a single URL. This scenario is represented in FIG. 1 as Set N 32. The URL to file mapping function evaluates the conditions 34 of Set N 32 of web pages to determine if current access to Set N is allowed. If the conditions 34 evaluate to true based on the current state variable(s), then Entry Page N 36 is returned to the browser program 10 on the client system 12.

State setting device 38 writes the current status of one or more state variables in the state information database 18 within the server system 14. In one embodiment, the state setting device is a PC operated by the content author of the web page sets. The content author 40 uses a web page creation program 42 on a PC 44 to create multiple web page sets and installs them on the server. For example, the content author designs two web page sets. One web page set is to be available for access if the content author is currently active on the computer network. This web page set gives the addresses of applications that user can use to contact the content author (such as an Internet telephone or videophone application, a multi-player game that is waiting for a partner, etc.). The condition for this first web page set requires the server system 14 to query a database (not shown) for the content author's information. The content author's PC updates this database whenever the content author is connected to the network. If the contact author is not found in the database, the server system passes over the first web page set and checks the conditions of a second web page set (which could be a default set of web pages with conditions that are always true). The second set of web pages inform the user that the content author is not currently on-line but can be reached through electronic mail (e-mail), giving the content author's e-mail address.

Figure 2:
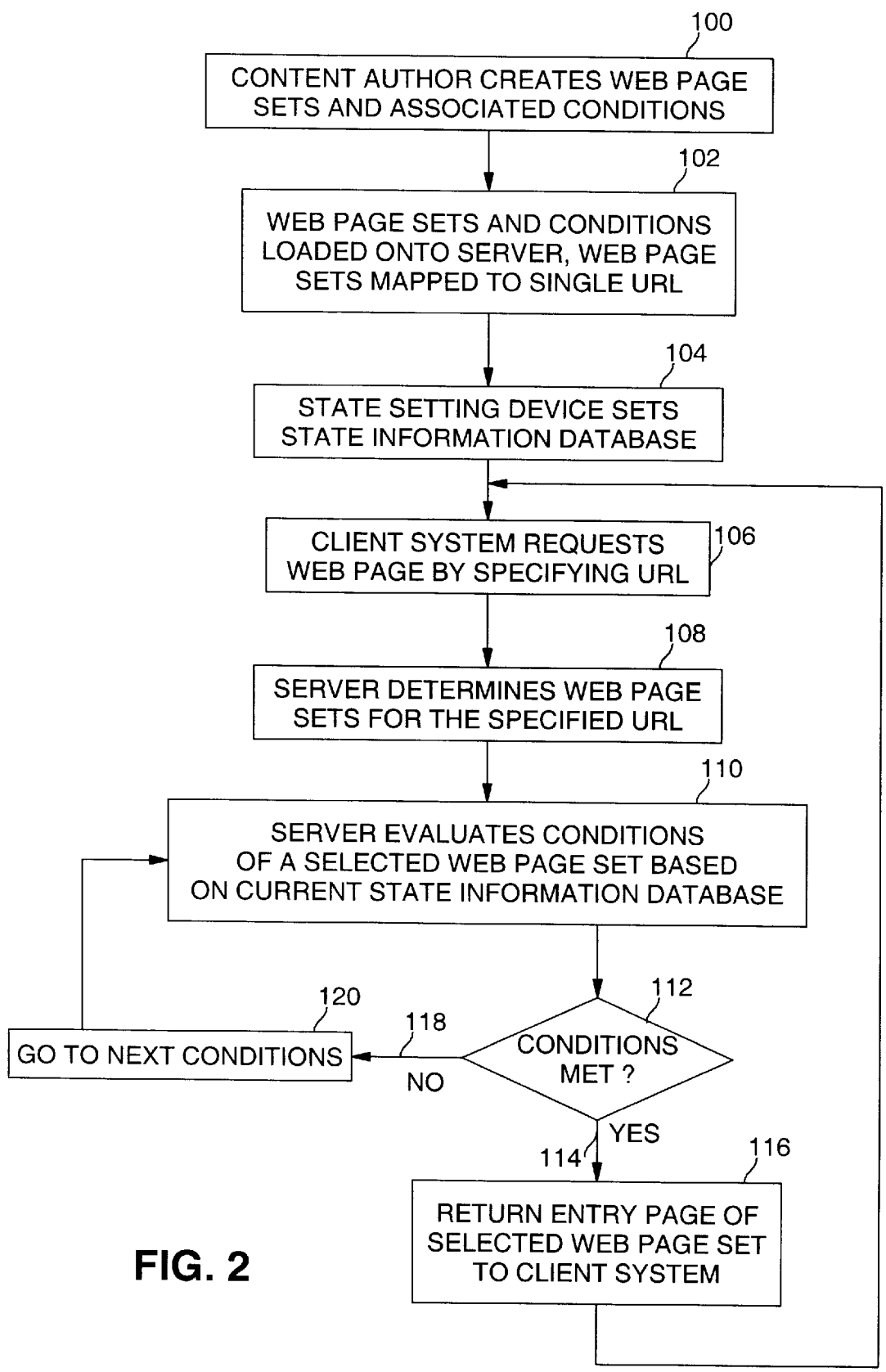
FIG. 2 is a flow diagram of 1he steps of providing dynamic web page sets according to an embodiment of the present invention.

FIG. 2 is a flow diagram of the steps of providing dynamic web page sets according to an embodiment of the present invention. At step 100, a content author creates multiple web page sets and associated conditions. At step 102, the web page sets and conditions are loaded onto a server, with the web page sets being mapped to a single URL. At step 104, a state setting device (e.g., the content author's PC) sets current state information in the state information database.

For example, the current state information could be a Boolean flag indicating whether the content author is currently logged onto a network. The state information database is updated by the state setting device whenever events warrant a change in state. At step 106, a user operating a client system requests a web page by specifying a URL and sending it to the server. At step 108, the server receives the request and determines the web page sets associated with the specified URL. Next, at step 110, the server evaluates the conditions of a selected web page set based on the current state information database entry for the URL. Initially, the conditions associated with the first web page set for the requested URL are evaluated. On subsequent operations, conditions for successive web page sets are evaluated. At step 112, the server determines if the conditions are met. If the conditions are met, Yes path 114 is taken to step 116. At step 116, the entry page of the selected web page set having the conditions that are currently satisfied are returned to the client system for viewing by the user. Processing continues with further user requests at step 106. If the conditions are not met at step 112, No path 118 is taken to step 120. At step 120, the processing continues with the next conditions for the next web page set associated with the requested URL.

In another embodiment of the present invention, the conditions are set in the user's browser program and transferred to the state information database in the server. The conditions could represent, for example, a choice of language for presentation of text in a set of web pages. When the user's browser program indicates that the preferred presentation language is English, the URL to file mapping function successfully evaluates the conditions for a web page set with English text. Alternatively, if the choice of language is German, the URL file to mapping function successfully evaluates the conditions for a different web page set with German text. Unlike current methods of implementing such functionality with CGI scripts, the redirection of web page content with the present invention is transparent to the user. Additionally, this embodiment utilizes only one connection from the client system to the server system, instead of two connections as in the prior art.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention

What is claimed is:

1. A method of providing a web page by a server comprising:

mapping a plurality of web pages to a single uniform resource locator (URL), the web pages each having at least one associated condition, such that a request for a web page indicated by the URL results in returning only one of the plurality of web pages mapped to the URL;

setting a state corresponding to the plurality of web pages in a database;

accepting a request for a web page specified by the URL;

selecting one of the plurality of web pages mapped to the URL;

evaluating the at least one condition associated with the selected web page based on the state; and sending the selected web page when the at least one condition is met.

2. The method of claim 1, wherein the plurality of web pages comprise a plurality of web page sets, each web page set comprising a plurality of web pages and having one entry web page, each web page set being associated with at least one condition, and wherein the sending step sends the entry web page for a web, page set corresponding to the selected web page.

3. The method of claim 1, wherein the setting step comprises setting the state according to a current operating load of the server.

4. The method of claim 1, wherein the setting step comprises setting the state according to a current operating status of an external device.

5. The method of claim 4, wherein the external device is an environmental sensor.

6. The method of claim 4, wherein the external device is a personal computer.

7. The method of claim 1, wherein the setting step comprises setting the state according to a language selected by a user sending the request to the server.

8. The method of claim 1, wherein the setting step comprises setting the state according to whether an author of the plurality of web pages is logged on to a network coupled to the server.

9. The method of claim 1, further comprising creating the plurality of web pages and associated conditions and installing the plurality of web pages and associated conditions on the server.

10. The method of claim 1, further comprising repeating the selecting and evaluating steps until at least one condition is met.

11. A server system coupled to a computer network for conditionally providing a web page comprising:

means for mapping a plurality of web pages to a single uniform resource locator (URL), the web pages each having at least one associated condition, such that a request for a web page indicated by the URL results in returning only one of the plurality of web pages mapped to the URL;

means for setting a state corresponding to the plurality of web pages in a database;

means for accepting a request for a web page specified by the URL;

means for selecting one of the plurality of web pages mapped to the URL;

means for evaluating the at least one condition associated with the selected web page based on the state; and means for sending the selected web page when the at least one condition is met.

12. The server system of claim 11, wherein the plurality of web pages comprise a plurality of web page sets, each web page set comprising a plurality of web pages and having one entry web page, each web page set being associated with at least one condition, and wherein the sending means sends the entry web page for a web page set corresponding to the selected web page.

13. The server system of claim 11, wherein the setting means comprises means for setting the state according to a current operating load of the server.

14. The server system of claim 11, wherein the setting means comprises means for setting the state according to a current operating status of an external device.

15. The server system of claim 14, wherein the external device is an environmental sensor.

16. The server system of claim 14, wherein the external device is a personal computer.

17. The server system of claim 11, wherein the setting means comprises means for setting the state according to a language selected by a user sending the request to the server.

18. The server system of claim 11, wherein the setting means comprises means for setting the state according to whether an author of the plurality of web pages is logged on to the computer network coupled to the server.

19. The server system of claim 11, further comprising means for creating the plurality of web pages and associated conditions and means for installing the plurality of web pages and associated conditions on the server.

20. A server for providing conditional access to a web page comprising:

a plurality of web pages mapped to a single uniform resource locator (URL), the web pages each having at least one associated condition, such that a request for a web page indicated by the URL results in returning only one of the plurality of web pages mapped to the URL;

a database to store at least one state corresponding to the plurality of web pages in a database; and a URL-to-file mapping function to accept a request for a web page specified by the URL, to select one of the plurality of web pages mapped to the URL, to evaluate the at least one condition associated with the selected web page based on the state; and to send the selected web page when the at least one condition is met.

21. The server of claim 20, wherein the plurality of web pages comprise a plurality of web page sets, each web page set comprising a plurality of web pages and having one entry web page, each web page set being associated with at least one condition, and wherein the URL-to-file mapping function sends the entry web page for a web page set corresponding to the selected web page.

22. The server of claim 20, further comprising means for setting the state according to a current operating load of the server.

23. The server of claim 20, further comprising means for setting the state according to a current operating status of an external device.

24. The server of claim 23, wherein the external device is an environmental sensor.

25. The server of claim 23, wherein the external device is a personal computer.

26. The server of claim 20, further comprising means for setting the state according to a language selected by a user sending the request to the server.

27. The server of claim 20, further comprising means for setting the state according to whether an author of the plurality of web pages is logged on to a network coupled to the server.

28. The server of claim 20, further comprising means for creating the plurality of web pages and associated conditions and means for installing the plurality of web pages and associated conditions on the server.

29. A machine readable medium having stored therein a plurality of machine readable instructions designed to be executed by a processing unit, the machine readable instructions for mapping a plurality of web pages to a single uniform resource locator (URL), the web pages each having at least one associated condition, such that a request for a web page indicated by the URL results in returning only one of the plurality of web pages mapped to the URL, for setting a state corresponding to the plurality of web pages in a database, for accepting a request for a web page specified by the URL, for selecting one of the plurality of web pages mapped to the URL, for evaluating the at least one condition associated with the selected web page based on the state, and for sending the selected web page when the at least one condition is met.

* * * * *

UNITED STATES PATENT AND TRADEMARK OFFICE
CERTIFICATE OF CORRECTION

PATENT NO.   : 6,038,598
DATED        : March 14, 2000
INVENTOR(S)  : Danneels

It is certified that error appears in the above-identified patent and that said Letters Patent is hereby corrected as shown below:

Column 2,
Line 17, delete "1he" and insert -- the --.

Signed and Sealed this

Seventh Day of May, 2002

Attest:

JAMES E. ROGAN
Attesting Officer   Director of the United States Patent and Trademark Office